Figure 18:
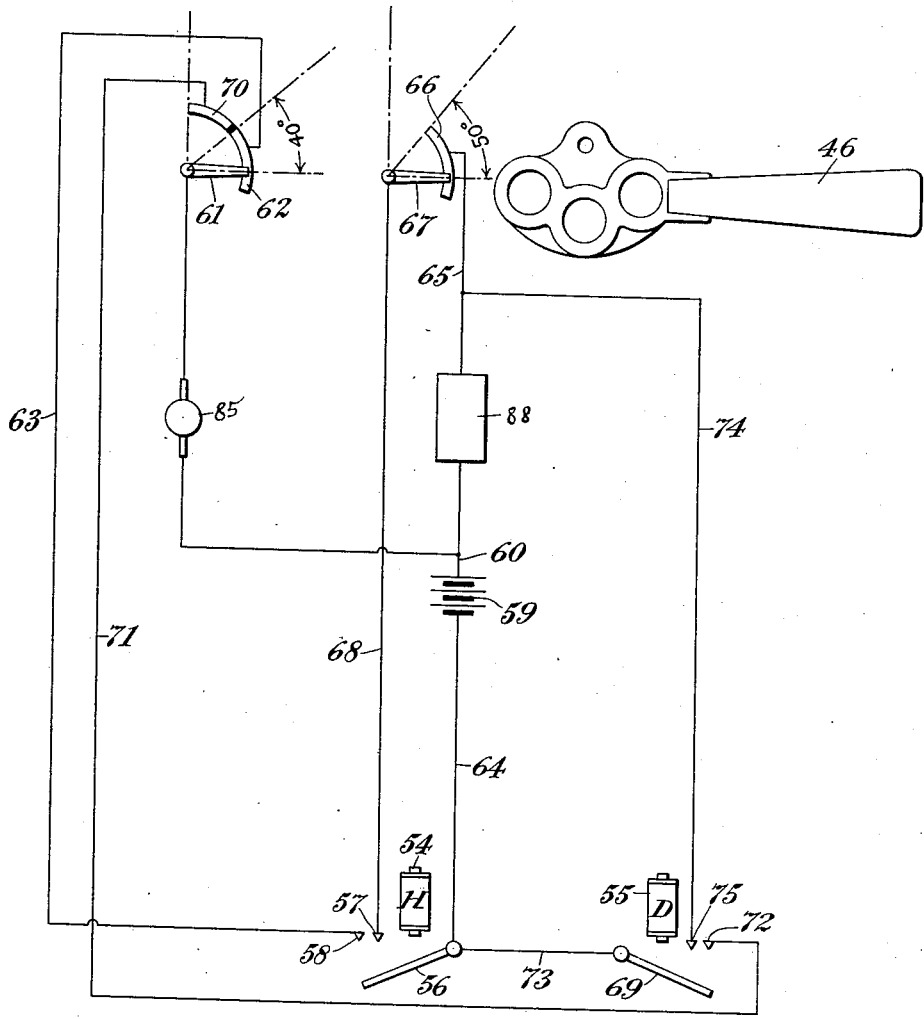

C. W. COLEMAN, DEC'D.
K. COLEMAN, ADMINISTRATRIX.
MOTOR MECHANISM.
APPLICATION FILED SEPT. 10, 1910.
1,095,453.
Patented May 5, 1914.
5 SHEETS—SHEET 1.
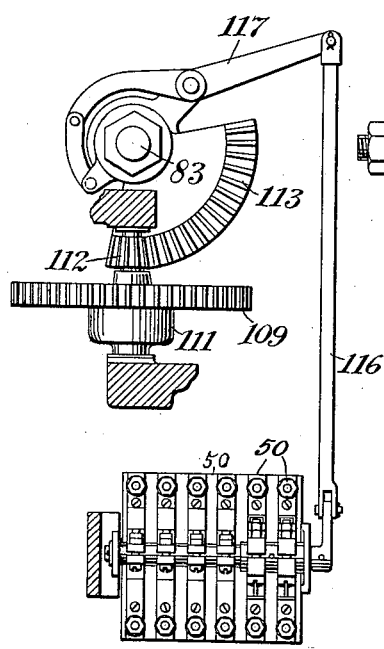
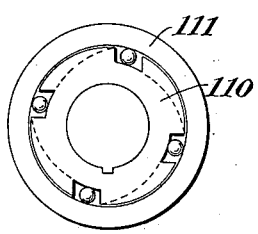
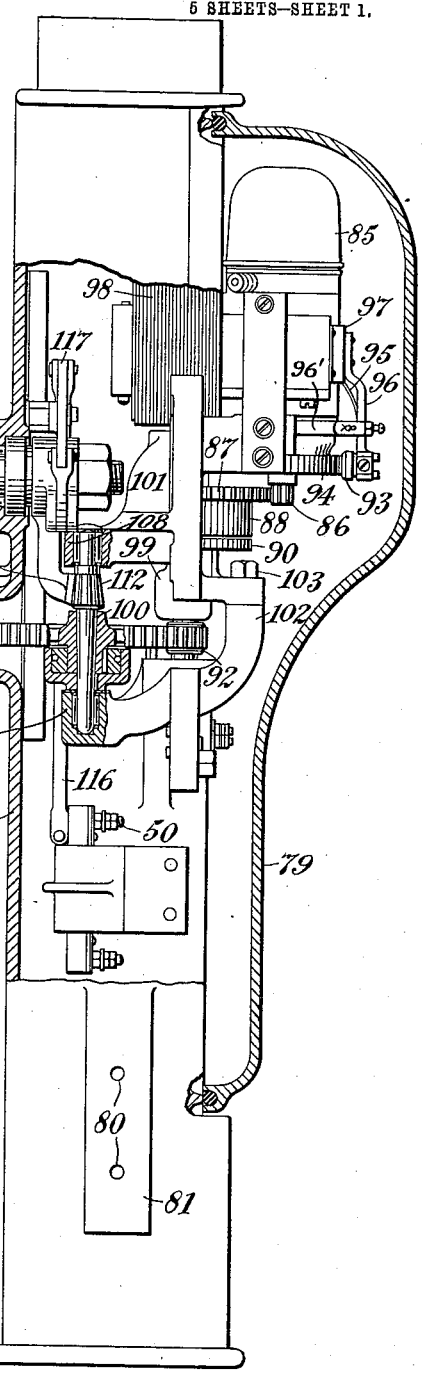
Witnesses:
Victor B. Borst
Wm. Ashley Kelly
Inventor:
Clarence W. Coleman
by Henry D. Williams
Attorney.

C. W. COLEMAN, DEC'D.
K. COLEMAN, ADMINISTRATRIX.
MOTOR MECHANISM.
APPLICATION FILED SEPT. 10, 1910.
1,095,453.
Patented May 5, 1914.
5 SHEETS—SHEET 2.
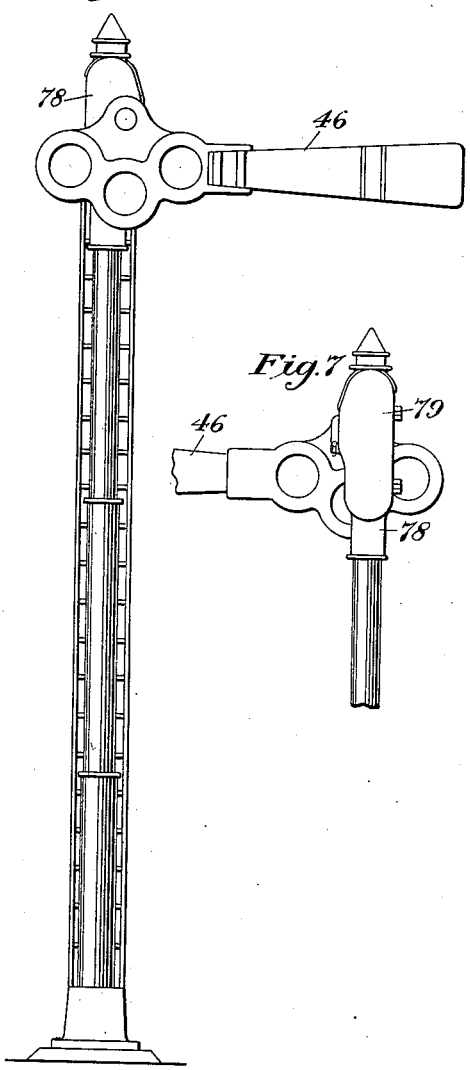
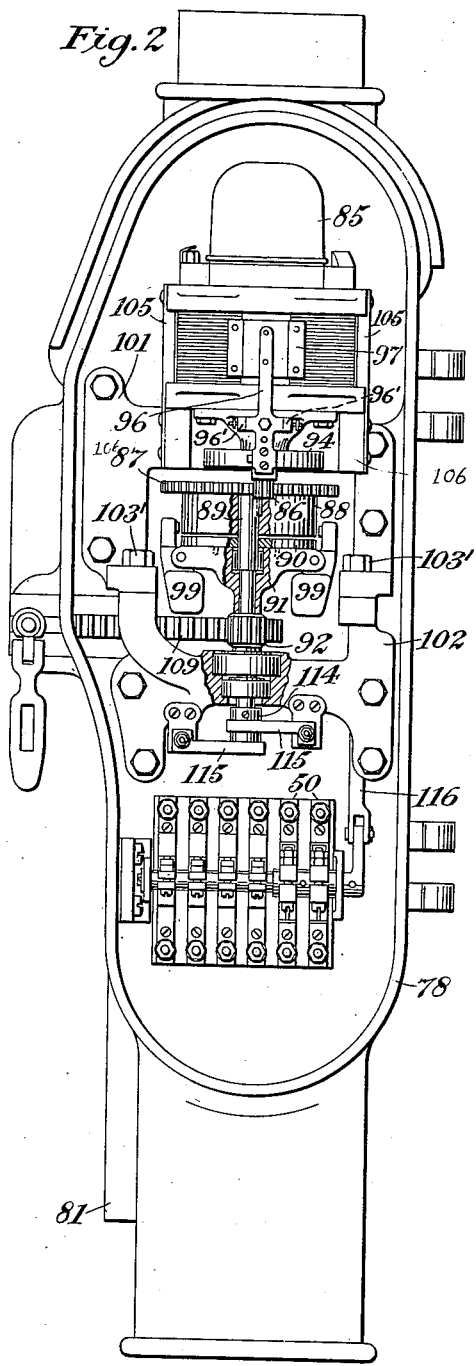
Witnesses:
Victor D. Borst
Wm. Ashley Kelly
Inventor:
Clarence W. Coleman
by Henry H. Williams
Attorney.

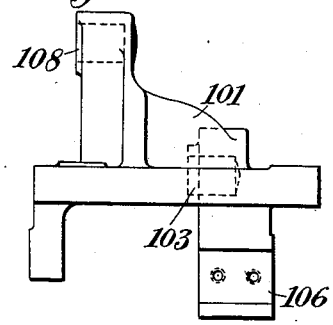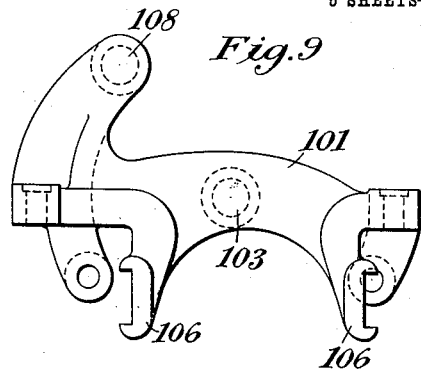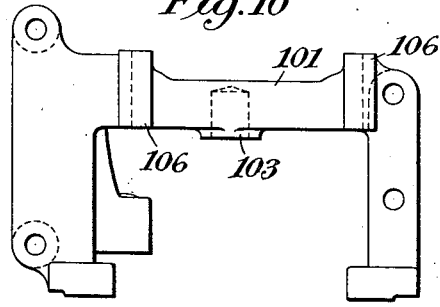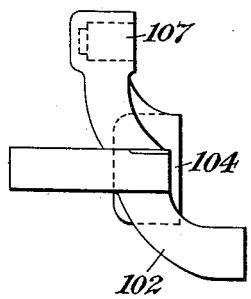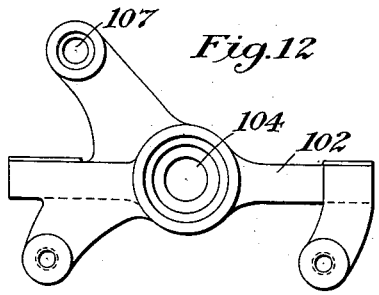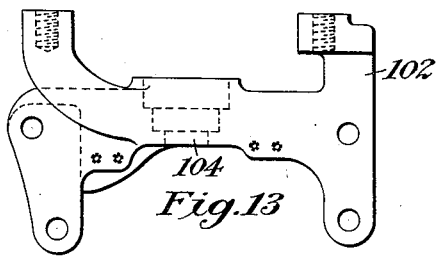

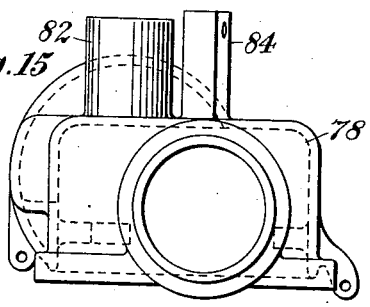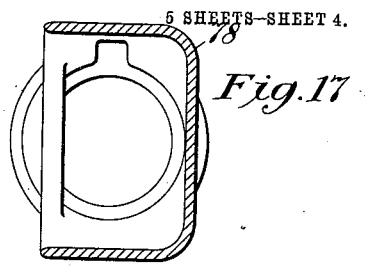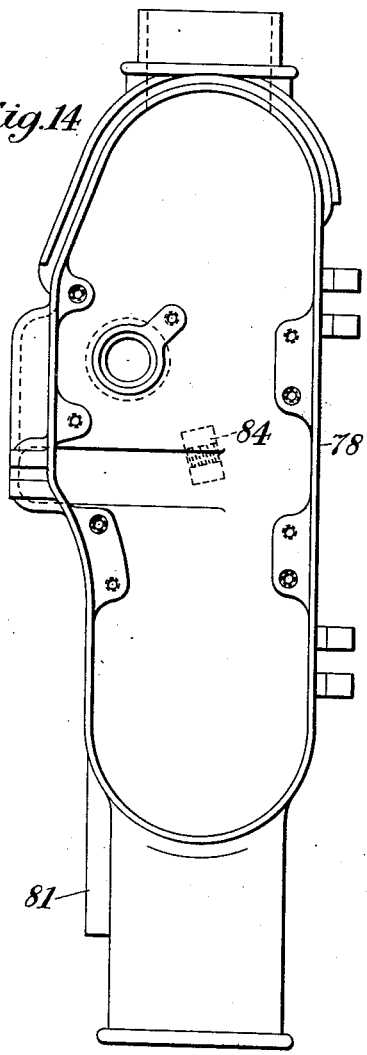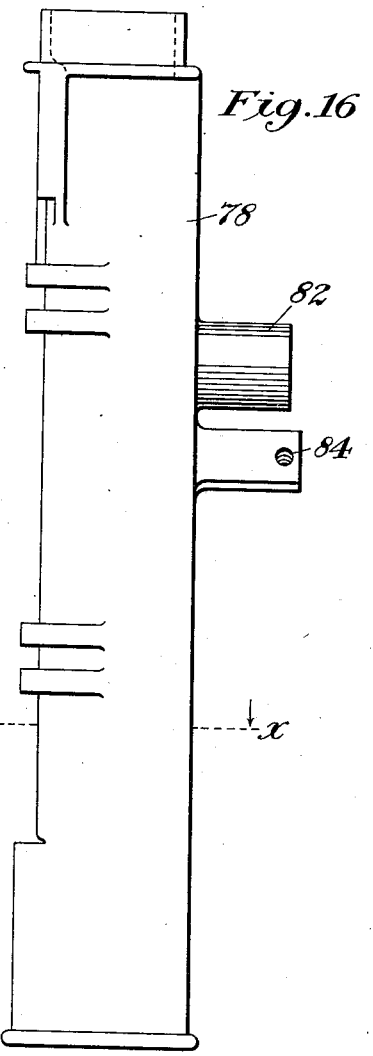

C. W. COLEMAN, DEC'D.
K. COLEMAN, ADMINISTRATRIX.
MOTOR MECHANISM.
APPLICATION FILED SEPT. 10, 1910.

1,095,453.

Patented May 5, 1914.
5 SHEETS—SHEET 5.

Witnesses:
Victor D. Borst
Wm. Ashley Kelly

Inventor:
Clarence W. Coleman
by Henry D. Williams
Attorney.

UNITED STATES PATENT OFFICE.

CLARENCE W. COLEMAN, OF WESTFIELD, NEW JERSEY; KATHERINE COLEMAN, ADMINISTRATRIX OF SAID CLARENCE W. COLEMAN, DECEASED, ASSIGNOR, BY MESNE ASSIGNMENTS, TO THE HALL SWITCH & SIGNAL COMPANY, OF NEW YORK, N. Y., A CORPORATION OF MAINE.

MOTOR MECHANISM.

1,095,453.  Specification of Letters Patent.  Patented May 5, 1914.

Application filed September 10, 1910. Serial No. 581,410.

*To all whom it may concern:*

Be it known that I, CLARENCE W. COLEMAN, a citizen of the United States, residing at Westfield, in the county of Union and State of New Jersey, have invented a certain new and useful Improvement in Motor Mechanism, of which the following is a specification, reference being had therein to the accompanying drawings, forming part thereof.

My invention relates to motor mechanisms and particularly to electric motor mechanisms, and is especially adapted for use in railway signaling systems for actuating a visual signal, as a semaphore.

My invention is applicable to such motor mechanisms in general, irrespective of their location relative to the signal post, though the illustrated embodiments of my invention are arranged and particularly intended to be located at the top of the signal post and directly connected to the movable member, or in other words, they belong to that class known as "top-post" motor mechanisms.

Generally speaking, the objects of my invention are reliability and efficiency of operation, compactness and durability and simplicity of construction, and economy of manufacture and maintenance.

Other objects and advantages of my invention will appear from the following description.

I shall now describe my invention with reference to the accompanying drawings, and shall thereafter point out my invention in claims.

Figure 1 is a side elevation of an apparatus embodying the preferred form of my invention, and shows the casing and cover partly sectioned away to disclose the interior. Fig. 2 is a front elevation of the same, showing the cover removed. Fig. 3 is a detail front elevation of the circuit controller and the actuating parts therefor. Fig. 4 is a detail plan view, on enlarged scale, of the ball clutch and case. Fig. 5 is a detail side elevation, on enlarged scale, of the ball clutch, with the case removed. Figs. 6 and 7 are, respectively, front and rear views of a semaphore and signal post, showing my invention applied thereto. Figs. 8, 9 and 10 are, respectively, an enlarged detail end view, plan view, and front elevation of the top bearing support. Figs. 11, 12 and 13 are, respectively, an enlarged detail end view, plan view, and front elevation of the lower bearing support. Figs. 14, 15, 16 and 17 are details of the casing, showing the cover removed. Fig. 14 is a front elevation, Fig. 15 is a plan view, Fig. 16 is a side elevation, and Fig. 17 is a horizontal section taken on line x—x of Fig. 16. Fig. 18 is a diagram illustrating the electrical circuits in control of the apparatus.

I have shown my invention arranged to actuate what is known as a "three-position" semaphore signal, though it is equally adapted for use in connection with various other signaling devices.

The illustrated embodiment of my invention is arranged to be located vertically on the signal post, as illustrated in Figs. 6 and 7. The apparatus is inclosed in a casing 78 open at its front, and provided with a cover 79 hinged at the right side. The lower end of the casing is cylindrical and arranged to fit over the end of the signal post, and to be secured thereto by casting sulfur or metal around the post. Holes 80 in a rib or thickened portion 81 of the cylindrical portion are for the purpose of supporting a lamp bracket. The rear of the casing is provided with a cylindrical hollow projection 82 which serves as a bearing for the semaphore or blade shaft 83; and on the rear of the casing below the bearing for the semaphore shaft, is a stop 84 for the semaphore either integral with the casing or secured thereto in any suitable manner. The power device is an electric motor 85 suitably supported at the front and top of the casing. The casing 78 is provided with five lugs, as shown in Fig. 14, to which are secured an upper bearing support 101 and a lower bearing support 102, which are secured together by bolts 103' (see Figs. 1 and 2). The motor supports 105 are secured to the arms 106 and to the upper bearing support 101. Between the armature shaft of the motor and the blade shaft 83, suitable transmission means are provided which will now be described.

On the lower end of the armature shaft (not shown) is a small driving pinion 86, which meshes with a gear wheel 87 mounted on a vertical shaft 89, which I term the governor shaft. This shaft is journaled at its upper end in the bearing 103 of the upper bearing support 101, and at its lower end in the bearing 104 of the lower bearing support 102. To connect the motor to and disconnect it from the transmission mechanism I employ a magnetic clutch the annular magnet member 88 of which is electrically connected in parallel with the motor, and is fixed to the gear wheel 87 and keyed on the shaft 89. The annular armature member 90 of the magnetic clutch is loosely mounted on the governor shaft 89 and is secured by pins (not shown) to a sleeve member 91, also loosely mounted on the governor shaft, which sleeve member carries a pinion 92, either fixed to or made integral with the sleeve on its lower end. The sleeve 91 is provided with roller bearings, and suitable antifriction bearings are also provided (not shown) for the shaft 89.

In the rear of the governor shaft 89 is journaled another vertical shaft 100. This shaft 100 is journaled at its lower end in the bearing 107 of the lower bearing support 102, and at its upper end in the bearing 108 of the upper bearing support 101, roller bearings being provided as shown in Fig. 1. Loosely mounted on the shaft 100 is a gear wheel 109 which meshes with the pinion 92 on the sleeve 91 on the governor shaft. To rotatively connect the gear wheel 109 with the shaft 100, when the gear wheel is rotated in one direction relatively to the shaft, and to disconnect it from the shaft when it is rotated in the opposite direction relatively to the shaft, thereby eliminating the sudden stop of the gear wheel and its connected parts when the blade strikes the stop 84, I employ a one-way clutch or ratchet device, the well known ball or roller clutch being preferred. The hub of the gear wheel 109 has keyed concentrically thereon on the lower side of the gear wheel, an annular clutch member 110 provided with spiral cam grooves, as shown, in which locking balls operate in the usual way. A casing 111 surrounds the clutch and is keyed or otherwise secured to the shaft 100. As the gear wheel 109 is therefore rotated in one direction relatively to the shaft 100 it is connected by means of this clutch to the casing 111 and hence to the shaft 100; and when it is rotated in the opposite direction relatively to the shaft 100 the clutch releases in the well known way. On the shaft 100 is a sector-driving pinion 112 either integral with the shaft or fixed thereon. Secured to the blade shaft 83 is a sector 113 which meshes with the segment-driving pinion 112 and is actuated thereby to raise the blade as the pinion is rotated.

As shown in the drawings, the semaphore 46 is what is known as an upper-quadrant signal, that is, the blade is raised to a vertical position to indicate the clear position, and it tends to fall by gravity to the horizontal position to give the danger indication, and, being a three-position signal, will occupy an intermediate position, or 45 degrees above that shown in Figs. 6 and 7 to give the caution indication. When it is in the clear or caution position, therefore, and the clutch is released, it falls by gravity and rotates the train of transmission gears backward until it is stopped either at the caution or danger position. To prevent the motor armature from being rotated backward when the motor is deënergized and to hold the blade up while the clutch is energized, I employ a friction brake member 93, which bears against the periphery of a brake wheel 94 on the motor shaft. The brake 93 is mounted on one end of a pivoted arm 96 which has a laterally extending yoke formed integral therewith fitting downwardly over and pivoted to two upstanding supporting members 96′ on the motor casing, as shown, and the brake 93 is normally held in frictional engagement with the wheel 94 by a flat spring 95 and is raised from contact with the wheel when the opposite end of the arm 96, which carries a soft iron armature 97, is attracted as the field coils 98 of the motor are energized.

To prevent the transmission mechanism from being rotated backward too rapidly as the semaphore blade 46 falls by gravity when the magnetic clutch is deënergized, I provide a centrifugal governor carried by the sleeve 91, such as is described and claimed in my prior Patent No. 881,301, issued March 10, 1908, which frictionally engages the periphery of the annular magnet member 88 of the magnetic clutch. The sleeve 91 is provided with two pairs of oppositely extending lugs, as shown in Fig. 2, in each pair of which is pivoted a governor weight 99. The governor weights are arranged to frictionally bear with their upper ends on the periphery of the annular magnet member 88 of the magnetic clutch and are arranged with their lower weighted ends free to fly outward by centrifugal force as the sleeve member 91 is rotated, and thus press the upper ends of the governor weights inwardly against the periphery of the magnet and frictionally check the rotation of the sleeve and of the entire transmission mechanism operatively connected with the sleeve. By this means the blade is prevented from falling by gravity too rapidly. The fact that the blade shaft is not directly connected by the magnetic clutch to the motor, but instead is connected through a train of reducing gears, causes very slight strain to be placed on the clutch and friction brake 93 to hold the blade up, and hence my mechanism requires but slight electrical energy to hold the blade in its safety and caution position.

The one-way clutch connection between the shaft 100 and the gear wheel 109 prevents the parts being injured by a sudden stop of the semaphore blade when the blade strikes the stop 84, by releasing the gear wheel 109 and permitting the transmission mechanism to spin on from its own momentum as the blade strikes the stop, thus relieving the mechanism of the strain of a sudden stop. The collector rings 114 for the motor are located on the governor shaft 89 and the brushes 115 are attached to the lower bearing support 102. To control the motor branch of the electrical circuit, a contact controller 50, including several contacts, is employed. This is operated by the movement of the semaphore 46 through a link 116 which is operated by a crank arm 117 attached to the blade shaft 83, as shown in Fig. 3. As the blade shaft is oscillated, the circuit controller 50 is thus operated to open and close the motor circuit at the proper time.

The operation of my motor mechanism will be understood from the foregoing description and from Fig. 18 of the drawings. With the home and distant relays 54 and 55, respectively, deënergized, both the motor 85 and the clutch member 88 will be deënergized and the semaphore 46 will by gravity occupy the danger position as shown in Fig. 18. Now assuming that the home relay is energized, the contact finger 56 is picked up and closes the clutch contact 57 and the motor contact 58. The motor circuit is thereby completed as follows: from the battery 59, through the wire 60, the motor 85, wiper 61 which is one of the contact members of the contact controller 50, home segment 62, wire 63, contact 58, contact finger 56 and wire 64 back to the battery. The clutch circuit is completed as follows: from the battery 59, wire 60, clutch magnet 88, wire 65, segment 66, wiper 67 which is another of the contacts shown in the contact controller 50, wire 68, contact 57 contact finger 56 and wire 64 back to the battery. The motor armature thereby rotates, the clutch attracts its armature, and the semaphore blade is raised 45° to the caution position. The segment 62 is shown as 40° in length and the contact 66 as 50°; therefore, when the motor circuit wiper 61 wipes off the segment 62 and the motor circuit is broken and the motor stops, the wiper 67 is still in contact with the segment 66 and the clutch magnet remains energized and the semaphore blade is held to the caution position by the coöperation of the brake 96 and the clutch member 44. Now suppose the distant relay 55 be energized. It picks up its contact finger 69 and the motor circuit is again completed as follows: battery 59, wire 60, motor 85, wiper 61, segment 70, which is another one of the segments in the contact controller 50, wire 71, contact 72, contact finger 69, wire 73, wire 64, back to the battery. The motor again starts to rotate and to raise the semaphore. As soon, however, as the wiper 67 passes off the segment 66, which happens when the semaphore blade is raised 50° from the horizontal, the clutch circuit previously described is broken, but another clutch circuit has been completed by the energization of the distant relay, as follows: battery 59, wire 60, clutch magnet 88, wire 74, contact 75, contact finger 69, wire 73 and wire 64 back to the battery. The clutch, therefore, remains energized and the semaphore is raised until it assumes the vertical position, and the wiper 61 passes off the segment 70 when the motor circuit is broken. The clutch circuit, however, remains energized as long as the distant relay is energized and, therefore, the semaphore is held in vertical or clear position until the distant relay becomes deënergized. When this occurs, the semaphore blade falls by gravity, the governor ring 48 checking the rapidity of its fall, until the wiper 67 contacts with the segment 66, when the clutch circuit is again restored if the home relay 54 is energized. If both the home and distant relays are deenergized, both clutch circuits are broken and the semaphore falls to the danger position.

It is obvious that various modifications may be made in the constructions shown and above particularly described within the principle and scope of my invention.

I claim:

1. A motor mechanism for railway signals comprising, in combination with a movable member having a bias to one position, a motor for moving the movable member from its bias position, an electromagnetic clutch, speed reducing mechanism connecting the clutch and the movable member, the clutch comprising two parts adapted to be connected together by the energization of the clutch, one of said parts being joined to the mechanism connecting the clutch to the movable member and the other part being connected to the motor, and a centrifugal friction clutch member carried by the part of the electromagnetic clutch joined to the mechanism from the electromagnetic clutch to the movable member and adapted to frictionally bear against the other part of the electromagnetic clutch when the part carrying the friction clutch member is rotated.

2. A motor mechanism for railway signals comprising, in combination with a movable member having a bias to one position, a motor for moving the movable member from its bias position, an electromagnetic clutch, speed reducing mechanism connecting the clutch and the movable member, the clutch comprising an armature member and a magnet member adapted to be connected together by the energization of the clutch, the armature member being joined to the mechanism connecting the clutch to the movable member and the magnet member being connected to the motor, and a centrifugal friction clutch member carried by the armature member and adapted to frictionally bear against the magnet member when the armature member is rotated.

3. A motor mechanism for railway signals comprising, in combination with a movable member having a bias to one position, a motor for moving the movable member from its bias position, an electromagnetic clutch, speed reducing mechanism connecting the clutch and the movable member, the clutch comprising two parts adapted to be connected together by the energization of the clutch, one of said parts being joined to the mechanism connecting the clutch to the movable member and the other part being connected to the motor, a restraining device under the control of the field coils of the motor and operative to restrain the movement of the part of the clutch connected to the motor, and a centrifugal friction clutch member carried by the part of the electromagnetic clutch joined to the mechanism from the electromagnetic clutch to the movable member and adapted to frictionally bear against the other part of the electromagnetic clutch when the part carrying the friction clutch member is rotated.

4. A motor mechanism for railway signals comprising, in combination with a movable member having a bias to one position, a motor for moving the movable member from its bias position, an electromagnetic clutch, speed reducing mechanism connecting the clutch and the movable member, the clutch comprising an armature member and a magnet member adapted to be connected together by the energization of the clutch, the armature member being joined to the mechanism connecting the clutch to the movable member and the magnet member being connected to the motor, a restraining device under the control of the field coils of the motor and operative to restrain the movement of the part of the clutch connected to the motor, and a centrifugal friction clutch member carried by the armature member and adapted to frictionally bear against the magnet member when the armature member is rotated.

5. A motor mechanism for railway signals comprising, in combination with a movable member having a bias to one position, a motor for moving the movable member from its bias position, an electromagnetic clutch, speed reducing mechanism connecting the clutch and the movable member, the clutch comprising two parts adapted to be connected together by the energization of the clutch, one of said parts being joined to the mechanism connecting the clutch to the movable member and the other part being connected to the motor, a centrifugal friction clutch member carried by the part of the electromagnetic clutch joined to the mechanism from the electromagnetic clutch to the movable member and adapted to frictionally bear against the other part of the electromagnetic clutch when the part carrying the friction clutch member is rotated, and a one-way clutch between the movable member and the speed reducing mechanism arranged to operatively connect the movable member and the speed reducing mechanism when the speed reducing mechanism is operated by the motor and to rotate the speed reducing mechanism backward when the movable member assumes its bias position and to permit independent backward rotation of the speed reducing mechanism.

6. A motor mechanism for railway signals comprising, in combination with a movable member having a bias to one position, a motor for moving the movable member from its bias position, an electromagnetic clutch, speed reducing mechanism connecting the clutch and the movable member, the clutch comprising an armature member and a magnet member adapted to be connected together by the energization of the clutch, the armature member being joined to the mechanism connecting the clutch to the movable member and the magnet member being connected to the motor, a centrifugal friction clutch member carried by the armature member and adapted to frictionally bear against the magnet member when the armature member is rotated, and a one-way clutch between the movable member and the speed reducing mechanism arranged to operatively connect the movable member and the speed reducing mechanism when the speed reducing mechanism is operated by the motor and to rotate the speed reducing mechanism backward when the movable member assumes its bias position and to permit independent backward rotation of the speed reducing mechanism.

In testimony whereof I have affixed my signature in presence of two witnesses.

CLARENCE W. COLEMAN.

Witnesses:
VICTOR D. BORST,
BERNARD COWEN.